Nov. 26, 1957  R. M. VAN HOUSE  2,814,481
LAMINATED SPRING
Filed Aug. 16, 1952

Inventor
Robert M. Van House
By
Willits, Helwig & Baillio
Attorneys

2,814,481
LAMINATED SPRING

Robert M. Van House, Royal Oak, Mich., assignor to General Motors Corporation, Detroit, Mich., a corporation of Delaware Application August 16, 1952, Serial No. 304,769

3 Claims. (Cl. 267—47)

This invention relates to flat springs and particularly to leaf springs having a laminated metal structure adaptable for use in automobiles and other vehicles, metal archer's bows, etc.

While leaf springs have long been used in automobiles and in other applications, the energy storage capacity or resilience of these springs has been dependent in part on the particular metal used for the spring leaf member. These spring leaves have been strips of a single metal and have had a constant energy storage capacity per unit of mass, depending on the particular metal used. Therefore, when it was desired to increase the energy storage capacity of the springs, it was necessary to use an increased amount of metal, usually in the form of additional leaves. Such a construction increased both the cost and the weight of the springs.

It is a principal object of this invention to produce a more efficient spring member. A further object is to make a composite spring assembly having an increased energy storage capacity.

These and other objects are attained in accordance with the invention by utilizing a spring member which includes a metallic core member having thin outer layers of metal integrally bonded to its surface.

Referring now to the drawing.

Figure 1:
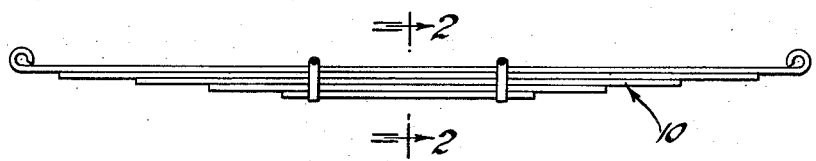
Figure 1 is a side view of a leaf spring.

Referring more particularly to the drawing, except as hereinafter described, the leaf spring shown in Figure 1 may be of the conventional type construction utilizing a plurality of superimposed leaves of varying length. The leaves may be of rectangular or other cross-section, depending upon the particular type of spring desired.

Figure 2:
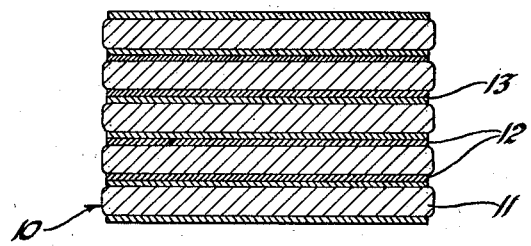
Figure 2 is a sectional view along the line 2—2 of Figure 1 showing a leaf spring composed of leaves embodying the invention.

Figure 2 shows in cross-section how the individual spring leaves embodying the invention may be assembled to form the completed leaf spring assembly indicated generally by 10. Each of the spring leaves comprises a core member 11 of a relatively lightweight metal and outer layers 12 of a metal having a high tensile strength bonded to said core member. If desired, a suitable friction inhibiting membrane may be inserted between the spring leaves at the wear surfaces 13. More particularly, satisfactory results have been obtained with a core member of a low density non-ferrous metal such as an alloy of aluminum or magnesium having outer layers of a ferrous metal bonded to it. In accordance with the preferred embodiment of the invention, optimum properties are provided with a composite spring assembly comprising a core member 11 of an aluminum alloy having thin outer layers 12 of steel bonded to its surfaces.

The composite spring assembly may be formed from metal stock laminated or bonded together in any manner suitable for the particular metals it is desired to unite as, for example, by use of an organic adhesive.

The thickness of the layers bonded to the core, as well as the core thickness, may be varied to meet the particular mechanical strength requirements. In the preferred embodiment of the invention, as shown in Figure 2, the outer metal layers 12 bonded to the core member 11 are much thinner than the core member itself. If desired, the metals forming the composite spring assembly may be tempered or otherwise heat treated in a conventional manner within a temperature range determined by the characteristics of the metals.

When a bending stress is applied to a leaf spring formed of a single metal the stresses near the neutral axis of the spring are very low in comparison with the stresses of the metal near the surface of the spring. Such a stress distribution inherently results in a low energy storage capacity per unit of mass since metal near the neutral axis, under a relatively low stress, is not being used efficiently. However, if a suitable low density metal is substituted for the metal near the neutral axis the energy storage capacity per unit of mass of the composite spring assembly is greatly increased. For optimum resiliency in a spring a proper balance must be obtained between the thicknesses of the layers, the moduli of elasticity of the metals and the permissible stresses of the metals.

To illustrate how the energy storage capacity of a spring is increased by this invention, tests were made using a single leaf type spring member composed of an aluminum alloy, having a modulus of elasticity of approximately 10,000,000 p. s. i., with outer layers of steel having a modulus of elasticity of approximately 30,000,000 p. s. i. bonded to its surfaces. A typical example of an aluminum base alloy that has been employed in accordance with the invention is one consisting by weight as follows: copper 1.6%, magnesium 2.5%, zinc 5.6%, chromium 0.3%, balance aluminum and normal impurities. The term "aluminum base alloy" as used in the claims is intended to mean an alloy having at least 80% aluminum. This spring member was compared with similar spring members of solid steel and of solid aluminum alloy. In the tests a laminated spring member, comprising an aluminum alloy core 9/16" thick with an 0.03" layer of steel bonded on each surface, was stressed to 200,000 p. s. i. by a bending moment resulting in a maximum stress on the aluminum alloy core member of 50,000 p. s. i. This is equivalent to an energy storage of 1160 inch pounds per pound of material. A comparable member made of solid steel and stressed to the above mentioned 200,000 p. s. i. can only store 890 inch pounds per pound of material, while a spring member made of aluminum alloy and stressed to the above mentioned 50,000 p. s. i. can store only 415 inch pounds per pound of material.

It will be seen that in a spring member made according to this invention the energy storage capacity or resilience is increased beyond that of a comparable spring member made of any of the laminating metals alone.

Thus, according to the invention, a spring may be formed which has adequate mechanical strength, with the same or a greater energy storage capacity than a comparable spring made of a single metal, and yet may be much lighter in weight since the spring may be formed of a relatively lightweight metal core member with thin layers of a stronger and tougher metal bonded to it.

While a spring comprising a plurality of laminated spring leaves has been described, it is to be understood that the invention may be used in connection with other types of leaf type springs, whether single or multiple leaf as, for example, in a metal archer's bow where the increased energy storage capacity increases the efficiency of the bow and the laminated structure practically eliminates the danger of injury in case of bow breakage since it is unlikely that more than one lamination would break at one time. The remaining laminations will prevent the broken parts from flying about at high velocity, thus safeguarding the archer.

Various changes and modifications of the embodiments of the invention described herein may be made by those skilled in the art without departing from the spirit and principles of the invention as defined in the claims.

I claim:

1. A spring leaf comprising an aluminum base alloy core member having a thickness of approximately 3/16 inch and outer layers of steel having a thickness of approximately .03 inch bonded to said core by means of an organic adhesive.

2. A spring leaf comprising a core member having a thickness of approximately 3/16 inch formed of a metal alloy of the class consisting of aluminum base and magnesium base alloys, and outer layers having a thickness of approximately 0.03 inch of resilient ferrous metal having high tensile strength adhesively bonded to said core.

3. A composite leaf spring assembly having an increased energy storage capacity comprising a plurality of superimposed leaves, each of said leaves including a core member having a thickness of approximately 3/16 inch formed of a metal alloy of the class consisting of aluminum base and magnesium base alloys with outer layers of ferrous metal having a thickness of approximately .03 inch adhesively bonded to said core member.

References Cited in the file of this patent

UNITED STATES PATENTS

| | | |
|---|---|---|
| 1,638,516 | Ware | Aug. 9, 1927 |
| 2,056,816 | Zimmerli | Oct. 6, 1936 |
| 2,376,854 | Saunders et al. | May 22, 1945 |
| 2,653,889 | Hager et al. | Sept. 29, 1953 |

FOREIGN PATENTS

| | | |
|---|---|---|
| 8,162 | Great Britain | Jan. 2, 1915 |
| 760,173 | France | Dec. 6, 1933 |